United States Patent
Aoki

(10) Patent No.: US 10,869,037 B2
(45) Date of Patent: Dec. 15, 2020

(54) DATA ENCODING SYSTEM, DATA ENCODING DEVICE, DATA ENCODING CONTROL DEVICE, DATA ENCODING METHOD, DATA ENCODING CONTROL METHOD, AND PROGRAM RECORDING MEDIUM

(71) Applicant: NEC Corporation, Tokyo (JP)

(72) Inventor: Hirofumi Aoki, Tokyo (JP)

(73) Assignee: NEC CORPORATION, Tokyo (JP)

(*) Notice: Subject to any disclaimer, the term of this patent is extended or adjusted under 35 U.S.C. 154(b) by 277 days.

(21) Appl. No.: 16/084,008

(22) PCT Filed: Mar. 14, 2017

(86) PCT No.: PCT/JP2017/010200
§ 371 (c)(1),
(2) Date: Sep. 11, 2018

(87) PCT Pub. No.: WO2017/164007
PCT Pub. Date: Sep. 28, 2017

(65) Prior Publication Data
US 2020/0296372 A1 Sep. 17, 2020

(30) Foreign Application Priority Data
Mar. 22, 2016 (JP) .................. 2016-057052

(51) Int. Cl.
G06K 9/36 (2006.01)
G06K 9/46 (2006.01)
(Continued)

(52) U.S. Cl.
CPC ........... H04N 19/124 (2014.11); H04N 19/14 (2014.11)

(58) Field of Classification Search
CPC ............................ H04N 19/124; H04N 19/14
(Continued)

(56) References Cited

U.S. PATENT DOCUMENTS 8,928,751 B2   1/2015 Antikidis et al.
2011/0187860 A1  8/2011 Antikidis et al.

FOREIGN PATENT DOCUMENTS

JP   2002315002 A   10/2002
JP   2002344751 A   11/2002
(Continued)

OTHER PUBLICATIONS

Chiang, et al., "A new rate control scheme using quadratic rate distortion model", Proceedings of International Conference on Image Processing (ICIP), Sep. 1996, pp. 73-76 (4 pages total).

Primary Examiner — Stephen P Coleman

(57) ABSTRACT

To provide a data encoding system that can control compression parameters when compressing sensing data in a flying object without setting a compression method in advance. The data encoding control device installed in a ground station detects a position on earth sensed by the sensor, determines information about a compression parameter of sensing data acquired through sensing performed by the sensor, based on the detected position, and notifies, to the data encoding device, the information about the determined compression parameter. The data encoding device acquires the information about compression parameter notified from the data encoding control device, and compresses sensing data acquired through sensing performed by the sensor, according to the acquired information about the compression parameter.

14 Claims, 12 Drawing Sheets

(51) Int. Cl.
*H04N 19/124* (2014.01)
*H04N 19/14* (2014.01)

(58) Field of Classification Search
USPC .......................................................... 382/239
See application file for complete search history.

(56) References Cited

FOREIGN PATENT DOCUMENTS

| | | |
|---|---|---|
| JP | 2008187306 A | 8/2008 |
| JP | 2012501137 A | 1/2012 |

| EXAMPLE | LATITUDE | LONGITUDE | COMPLEXITY |
|---|---|---|---|
| | 35°39'20"1752 | 139°44'28"8759 | 8.2875 |

E2

| EXAMPLE | POSITION ID | COMPLEXITY |
|---|---|---|
| | 2352894658 | 8.2875 |

E3

| EXAMPLE | LATITUDE | LONGITUDE | COMPLEXITY PARAMETER |
|---|---|---|---|
| | 35°39'20"17 | 139°44'28"85 | (9.4649, −0.0782) |

E4

| EXAMPLE | LATITUDE | LONGITUDE | QUANTIZATION GRANULARITY | GENERATED CODE AMOUNT PER PIXEL |
|---|---|---|---|---|
| | 35°39'20"17 | 139°44'28"85 | 12 | 2.8755 |

| | LATITUDE 1 | LONGITUDE 1 | LATITUDE 2 | LONGITUDE 2 | COMPLEXITY |
|---|---|---|---|---|---|
| EXAMPLE | 35°39'18"92 | 139°44'27"23 | 35°39'22"18 | 139°44'30"19 | 8.2875 |

E6

| | END POINT 1 | END POINT 2 | TRANSFORMATION MATRIX | COMPLEXITY |
|---|---|---|---|---|
| EXAMPLE | (0,0) | (4095,8191) | $\begin{pmatrix} 9.742 & -2.289 & 218979.172 \\ -2.252 & -9.788 & 2025769.183 \end{pmatrix}$ | 8.2875 |

E7

| | LATITUDE | LONGITUDE | COMPLEXITY | IMAGE SIZE |
|---|---|---|---|---|
| EXAMPLE | 35°39'20"17 | 139°44'28"85 | $3.2389 \times 10^7$ | 4096×8192 |

E8

| | LATITUDE | LONGITUDE | DATE AND TIME | COMPLEXITY |
|---|---|---|---|---|
| EXAMPLE | 35°39'20"17 | 139°44'28"85 | 2016/2/29 23:59:59 | 8.2875 |

| EXAMPLE | LATITUDE | LONGITUDE | ALTITUDE | ANGLE (ELEVATION ANGLE, AZIMUTH ANGLE) | COMPLEXITY |
|---|---|---|---|---|---|
| EXAMPLE | 35° 39'20"17 | 139° 44'28"85 | 20808.9 | (88.2853°, 128.2972°) | 8.2875 |

E10

| EXAMPLE | LATITUDE | LONGITUDE | SENSOR ID | COMPLEXITY |
|---|---|---|---|---|
| EXAMPLE | 35° 39'20"17 | 139° 44'28"85 | 00285 | 8.2875 |

E11

| EXAMPLE | LATITUDE | LONGITUDE | WEATHER | TEMPERATURE | HUMIDITY | COMPLEXITY |
|---|---|---|---|---|---|---|
| EXAMPLE | 35° 39'20"17 | 139° 44'28"85 | CLOUD | 22.5°C | 72.2% | 8.2875 |

E12

| EXAMPLE | LATITUDE | LONGITUDE | ENCODING SCHEME ID | QUANTIZATION GRANULARITY | GENERATED CODE AMOUNT PER PIXEL |
|---|---|---|---|---|---|
| EXAMPLE | 35° 39'20"17 | 139° 44'28"85 | 00001 | 0.1852 | 3.2898 |

DATA ENCODING SYSTEM, DATA ENCODING DEVICE, DATA ENCODING CONTROL DEVICE, DATA ENCODING METHOD, DATA ENCODING CONTROL METHOD, AND PROGRAM RECORDING MEDIUM

This application is a National Stage Entry of PCT/JP2017/010200 filed on Mar. 14, 2017, which claims priority from Japanese Patent Application 2016-057052 filed on Mar. 22, 2016, the contents of all of which are incorporated herein by reference, in their entirety.

TECHNICAL FIELD

The present invention relates to a data encoding system, a data encoding device, a data encoding control device, a data encoding method, a data encoding control method, and program.

BACKGROUND ART

In order to reduce the storage capacity and the transmission capacity when sensing data (e.g. image) of the ground acquired by sensing from the sky with a sensor mounted on a flying object such as a satellite are recorded to a storage medium or transmitted to the ground station, compression of the sensing data have been performed.

For example, an example of a method for acquiring, compressing, and transmitting a satellite image is described in PTL 1. According to the technique disclosed by PTL 1, when an image is acquired by a camera on a device mounted on a satellite, a feature value of the image and a predetermined natural object in the image are recognized, and an image acquired by replacing the natural object with a typical object is compressed by an algorithm related to the feature value, and the compressed image is transmitted to the ground. Here, examples of feature value of the image include texture of the image, complexity of the image. Examples of the predetermined natural object include sea, lake, forest. Examples of compression algorithms include DCT (Discrete Cosine Transform) compression, wavelet compression, fractal compression.

On the other hand, PTL 2 describes an image processing technique for analyzing geographical features illustrated in aerial photographs and satellite photographs, although it is not an image compression technique at the time of shooting an image in a flying object such as a satellite. According to the technique disclosed by PTL 2, the processing device that performs image processing selects an appropriate one of a plurality of compression processing algorithms in which compression parameters according to the purpose of use are set in advance, thus compressing the input aerial photograph and satellite photos.

Specifically, the processing device first reads original image information composed of an aerial photograph and a satellite image from an image input device such as a scanner into a storage device. Next, the processing device analyzes the original image information and extracts image features of the original image, such as average luminance, commercial area ratio, forest area ratio. At this time, although details are unknown, there is a recitation indicating that feature information is created with reference to the map information of the area captured in the original image. Next, the processing device compresses the original image using a compression processing algorithm according to the extracted image features. For example, when the processing device is intended to analyze a road map, the original image is compressed using a compression algorithm in which compression parameters suitable for the image features of the road are set. As a result, a compressed image in which the image quality of the road is guaranteed is generated. In addition, by compressing the same original image using a compression algorithm set with different compression parameters, a compressed image in which the image quality of forests and lakes are guaranteed can be generated. In addition, there is NPL 1 as a literature related to this technique.

CITATION LIST

Patent Literature

[PTL 1] JP 2012-501137 A
[PTL 2] JP 2002-344751 A

Non Patent Literature

[NPL 1] T. Chiang et al., "A new rate control scheme using quadratic rate distortion model", Proceedings of International
Conference on Image Processing (ICIP) 19-19 Sep. 1996.

SUMMARY OF INVENTION

Technical Problem

In the case of compressing sensing data such as images acquired through sensing performed by an image capture device or the like mounted on a flying object such as a satellite with the equipment mounted on the flying object, the equipment mounted on the flying object determines the compression algorithm to use based on the feature of the image in PTL 1. For this reason, it was difficult to control the compression parameters from the ground when compressing sensing data such as images acquired by sensing on equipment mounted on the flying object. Furthermore, in PTL 2, it was necessary to set a plurality of compression methods (processing algorithms) having compression parameters in advance so as to be selectable according to the purpose of use when compressing the input aerial photographs or satellite photograph.

It is an object of the present invention to provide a data encoding system that can control compression parameters when compressing sensing data in a flying object or the like and that is not required to set a compression method in advance.

Solution to Problem

A data encoding system, in accordance with some embodiments in the present invention includes a data encoding device mounted on a flying object having a sensor, and a data encoding control device installed in a ground station capable of communicating with the flying object. The data encoding control device includes:

detection unit that detects a position on earth sensed by the sensor;

determination unit that determines information about a compression parameter of sensing data acquired through sensing performed by the sensor, based on the detected position; and notification unit that notifies, to the data encoding device, the information about the determined compression parameter.

The data encoding device includes:

acquisition unit that acquires the information about compression parameter notified from the data encoding control device; and encoding unit that compresses sensing data acquired through sensing performed by the sensor, according to the acquired information about the compression parameter.

A data encoding device, in accordance with some embodiments in the present invention, is mounted on a flying object having a sensor. The device includes:

a data encoding unit that acquires information about a compression parameter from a data encoding control device installed in a ground station capable of communicating with the flying object, the data encoding control device detecting a position on earth sensed by the sensor and determining the compression parameter of sensing data acquired through sensing performed with the sensor, based on the detected position, the data encoding control device notifying the determined information about the compression parameter to the data encoding device; and encoding unit that compresses the sensing data acquired through sensing performed with the sensor, based on the acquired information about the compression parameter.

A data encoding control device, in accordance with some embodiments in the present invention, is installed in a ground station capable of communicating with a flying object carrying a sensor and a data encoding device compressing sensing data acquired through sensing performed by the sensor.

The data encoding control device includes:

detection unit that detects a position on earth sensed by the sensor;

determination unit that determines information about a compression parameter of the sensing data acquired through sensing performed by the sensor, based on the detected position; and notification unit that notifies, to the data encoding device, the information about the determined compression parameter.

A data encoding method, in accordance with some embodiments in the present invention, is executed by a data encoding device mounted on a flying object having a sensor.

The data encoding method includes:

acquiring information about a compression parameter from a data encoding control device installed in a ground station capable of communicating with the flying object, the data encoding control device detecting a position on earth sensed by the sensor and determining the compression parameter of sensing data acquired through sensing performed with the sensor, based on the detected position, the data encoding control device notifying the determined information about the compression parameter to the data encoding device; and compressing the sensing data acquired through sensing performed with the sensor, based on the acquired information about the compression parameter.

A data encoding control method, in accordance with some embodiments in the present invention, is executed by a data encoding control device installed in a ground station capable of communicating with a flying object carrying a sensor and a data encoding device compressing sensing data acquired through sensing performed by the sensor.

The data encoding control method includes:

detecting a position on earth sensed by the sensor;

determining information about a compression parameter of the sensing data acquired through sensing performed by the sensor, based on the detected position; and notifying, to the data encoding device, the information about the determined compression parameter.

A recording medium, in accordance with some embodiments in the present invention, stores a program causing a computer mounted on a flying object having a sensor. The program functions as:

acquisition unit that acquires information about a compression parameter from a data encoding control device installed in a ground station capable of communicating with the flying object, the data encoding control device detecting a position on earth sensed by the sensor and determining the compression parameter of sensing data acquired through sensing performed with the sensor, based on the detected position, the data encoding control device notifying the determined information about the compression parameter to the computer; and encoding unit that compresses the sensing data acquired through sensing performed with the sensor, in accordance with the acquired information about the compression parameter.

A recording medium, in accordance with some embodiments in the present invention, stores a program causing a computer installed in a ground station capable of communicating with a flying object carrying a sensor and a data encoding device compressing sensing data acquired through sensing performed by the sensor. The program functions as:

detection unit that detects a position on earth sensed by the sensor;

determination unit that determines information about a compression parameter of the sensing data acquired through sensing performed by the sensor, based on the detected position; and notification unit that notifies, to the data encoding device, the information about the determined compression parameter.

Advantageous Effects of Invention

According to the present invention, a data encoding system that can control compression parameters when compressing sensing data in a flying object or the like and that is not required to set a compression method in advance can be provided.

BRIEF DESCRIPTION OF DRAWINGS

FIG. 8 is a diagram illustrating a specific example of entries of a storage unit in a determination unit of the data encoding control device according to the present invention.

FIG. 9 is a diagram illustrating a specific example of entries of the storage unit in the determination unit of the data encoding control device according to the present invention.

FIG. 10 illustrates a specific example of entries of the storage unit in the determination unit of the data encoding control device according to the present invention.

DESCRIPTION OF EMBODIMENTS

Next, example embodiments of the present invention will be described in detail with reference to the drawings.

First Example Embodiment

Figure 1:
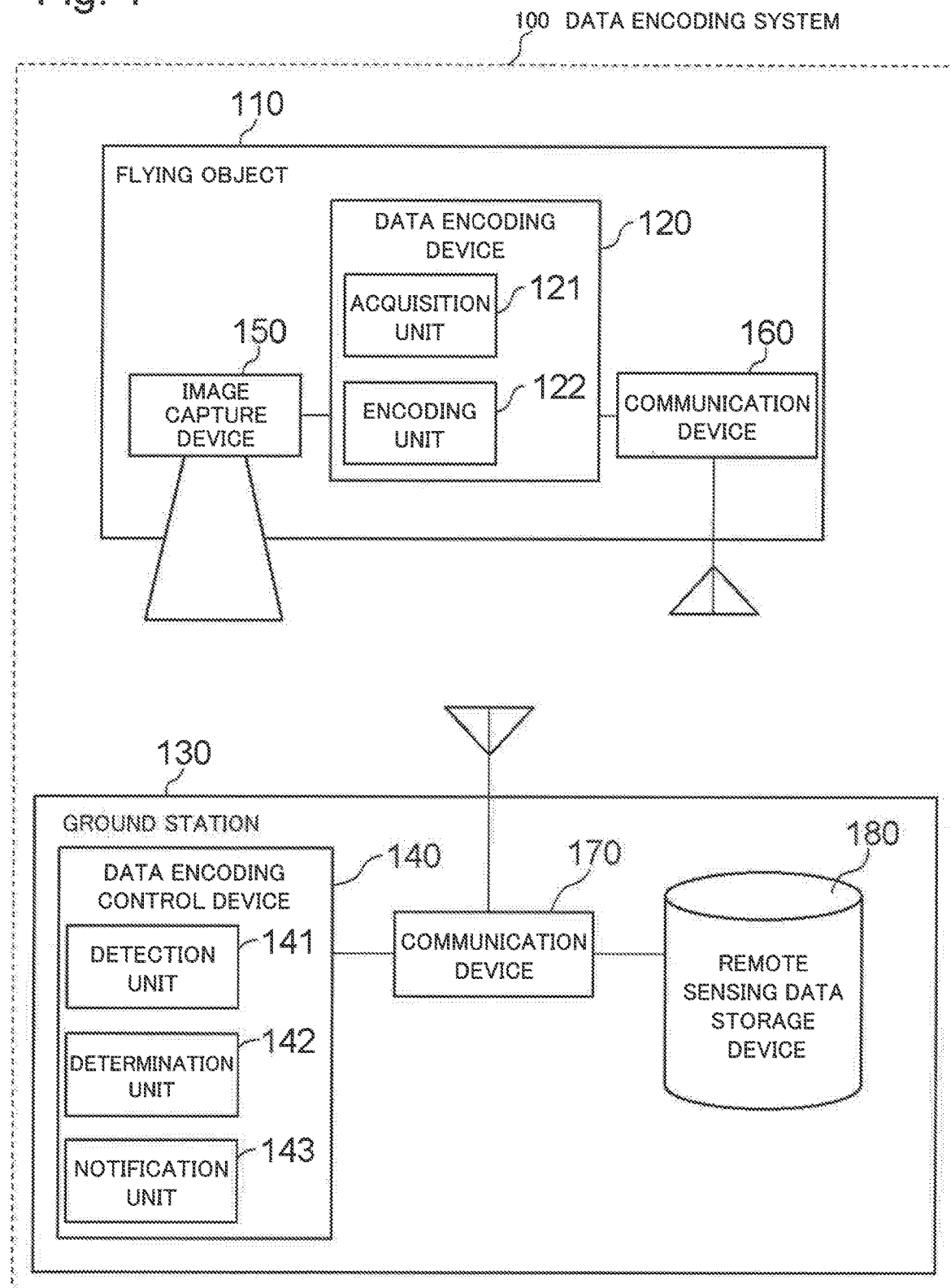
FIG. 1 is a block diagram of a data encoding system according to a first example embodiment of the present invention.

As illustrated in FIG. 1, data encoding system 100 according to the first example embodiment of the present invention includes data encoding device 120 mounted on flying object 110 and data encoding control device 140 installed in ground station 130.

Orbiting vehicle 110 is constituted by artificial satellites such as Earth observation satellites, airplanes, helicopters, balloons. In flying object 110, data encoding device 120, image capture device 150, and communication device 160 are mounted. Also, ground station 130 is constituted by an information processing device placed on the ground.

In ground station 130, data encoding control device 140, communication device 170 and remote sensing data storage device 180 are installed. Orbiting vehicle 110 and ground station 130 are configured to communicate with each other using communication devices 160 and 170.

Image capture device 150 is a kind of measuring instrument that measures the ground surface from a remote place and is also called a sensor. Image capture device 150 is constituted by, such as, an optical sensor, an active microwave sensor, a passive microwave sensor. Image capture device 150 outputs the sensed data image data to data encoding device 120 on a frame-by-frame basis, for example.

Data encoding device 120 compresses and encodes the image data input from image capture device 150, and outputs the compressed and encoded data string (called a bit stream) to communication device 160. Communication device 160 transmits the input bit stream to ground station 130. When communication device 170 of ground station 130 receives the bit stream from communication device 160 of flying object 110, communication device 170 of ground station 130 stores the bit stream in remote sensing data storage device 180. The stored bit stream is then used for various purposes.

In compression encoding, data encoding device 120 generates a compressed and encoded bit stream from the input image data by performing orthogonal transformation, quantization, and encoding on the input image data, for example. As the orthogonal transformation, data encoding device 120 performs wavelet transformation such as Haar wavelet transformation or other orthogonal transformation such as DCT transformation. Data encoding device 120 also divides the value range for each quantization granularity, and quantizes the orthogonal-transformed value which belongings to each range, for example, to the median value of the range. The quantization granularity is also referred to as a step size. The larger the quantization granularity is, the coarser the quantization is, the higher the compression ratio becomes, and the lower the image quality becomes. Conversely, the smaller the quantization granularity is, the finer the quantization becomes, the lower the compression ratio becomes, and the better the image quality becomes. Further, data encoding device 120 performs variable length encoding such as Huffman encoding or arithmetic encoding as encoding.

Data encoding device 120 includes acquisition unit 121 and encoding unit 122. Acquisition unit 121 has a function of acquiring information of the compression parameter notified from data encoding control device 140 through communication device 160. The information about the compression parameter is information defining the quantization granularity, and there are two possible cases, i.e., a case where the information about the compression parameter is the quantization granularity itself and the case where the information about the compression parameter is the image complexity. The image complexity is also referred to as activity. In the present example embodiment, the information about the compression parameter may be quantization granularity size or image complexity. Further, when the information of the compression parameter is image complexity, for example, when the image complexity used in the moving picture experts group (MPEG)-2 test model (TM) 5 method is used, the quantization granularity can be calculated from the image complexity and the output code amount using relational expression 1 of the quantization granularity, the image complexity, and the output code amount.

$$X=S*Q \quad (1)$$

X: image complexity, S: output code amount, Q: quantization granularity

Alternatively, the image complexity X may be a two-dimensional vector represented by $X=(x_1, x_2)$, and the quantization granularity may be calculated using the following relational expression 2 (see NPL 1).

$$S=x_1/Q+x_2/Q_2 \quad (2)$$

Encoding unit 122 has a function of performing orthogonal transformation, quantization, and encoding on the image data input from image capture device 150 as described above, generating a bit stream, and outputting the bit stream to communication device 160. At this time, encoding unit 122 determines the quantization granularity according to the information of the compression parameter acquired by acquisition unit 121, and performs quantization using the determined quantization granularity.

Data encoding control device 140 is configured to detect the position on the earth sensed by image capture device 150, determine, based on the detected position, the information about the compression parameter of the sensing data acquired through sensing performed by image capture device 150, and inform data encoding device 120 of the determined information about the compression parameter via communication device 170. Data encoding control device 140 includes detection unit 141, determination unit 142, and notification unit 143.

Detection unit 141 has a function of detecting a position on the earth sensed by image capture device 150. Determination unit 142 has a function of determining the information of the compression parameter of the sensing data acquired through sensing performed by image capture device 150 based on the position detected by detection unit 141. Notification unit 143 has a function of notifying data encoding device 120 of the information of the compression parameter determined by determination unit 142 via communication device 170.

Figure 2:
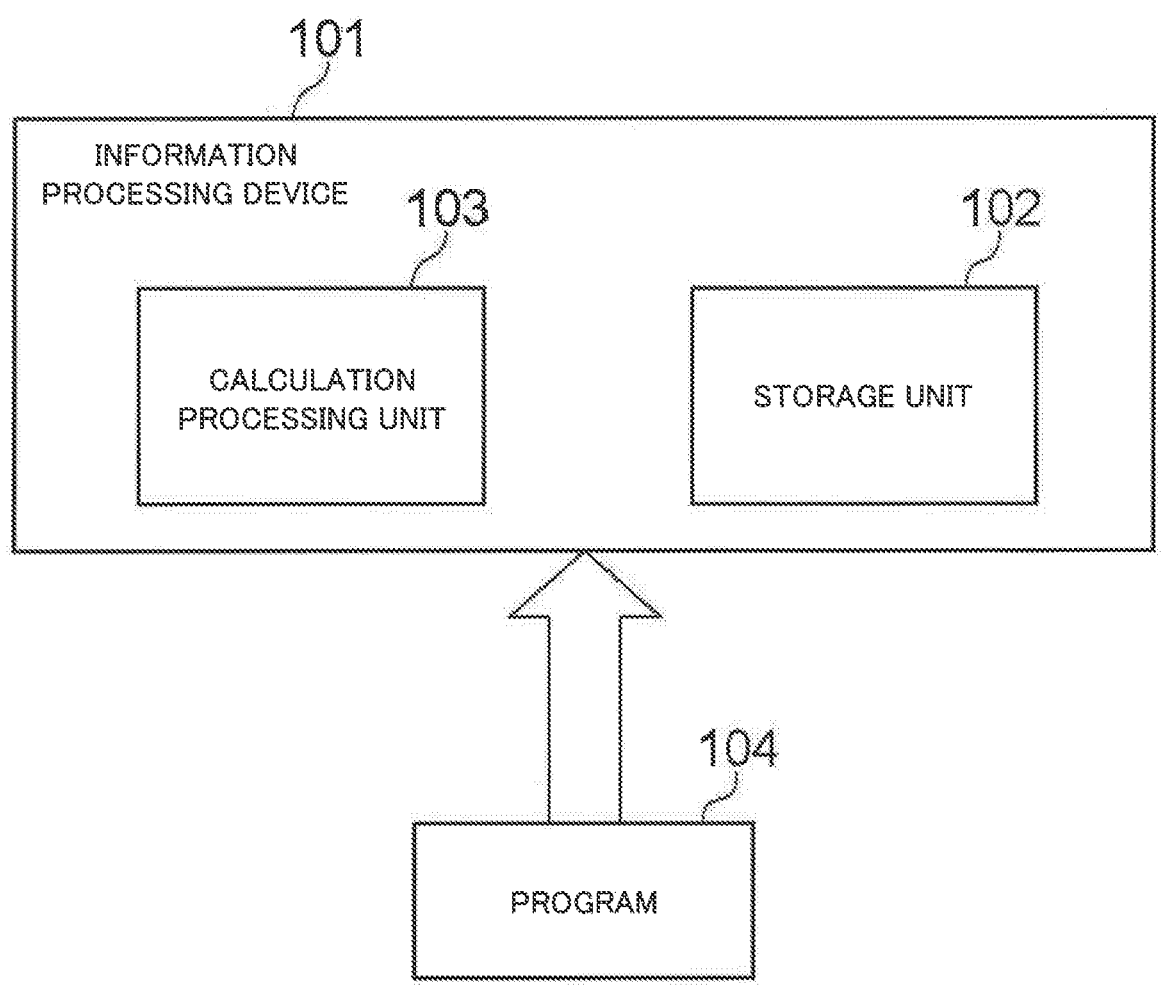
FIG. 2 is a block diagram illustrating an example of a hardware configuration for realizing a data encoding device and a data encoding control device of the present invention.

As illustrated in FIG. 2, for example, each of data encoding device 120 and data encoding control device 140 can be realized by an information processing device 101 such as a personal computer having storage unit 102 such as a memory or a hard disk and calculation processing unit 103 such as one or more microprocessors, and a program 104. Program 104 is read into the memory from an external computer readable recording medium at the time of starting up information processing device 101 and controls the operation calculation processing unit 103. With this control, calculation processing unit 103, data encoding device 120 realizes acquisition unit 121 and encoding unit 122, and data encoding control device 140 realizes detection unit 141, determination unit 142, and notification unit 143.

Figure 3:
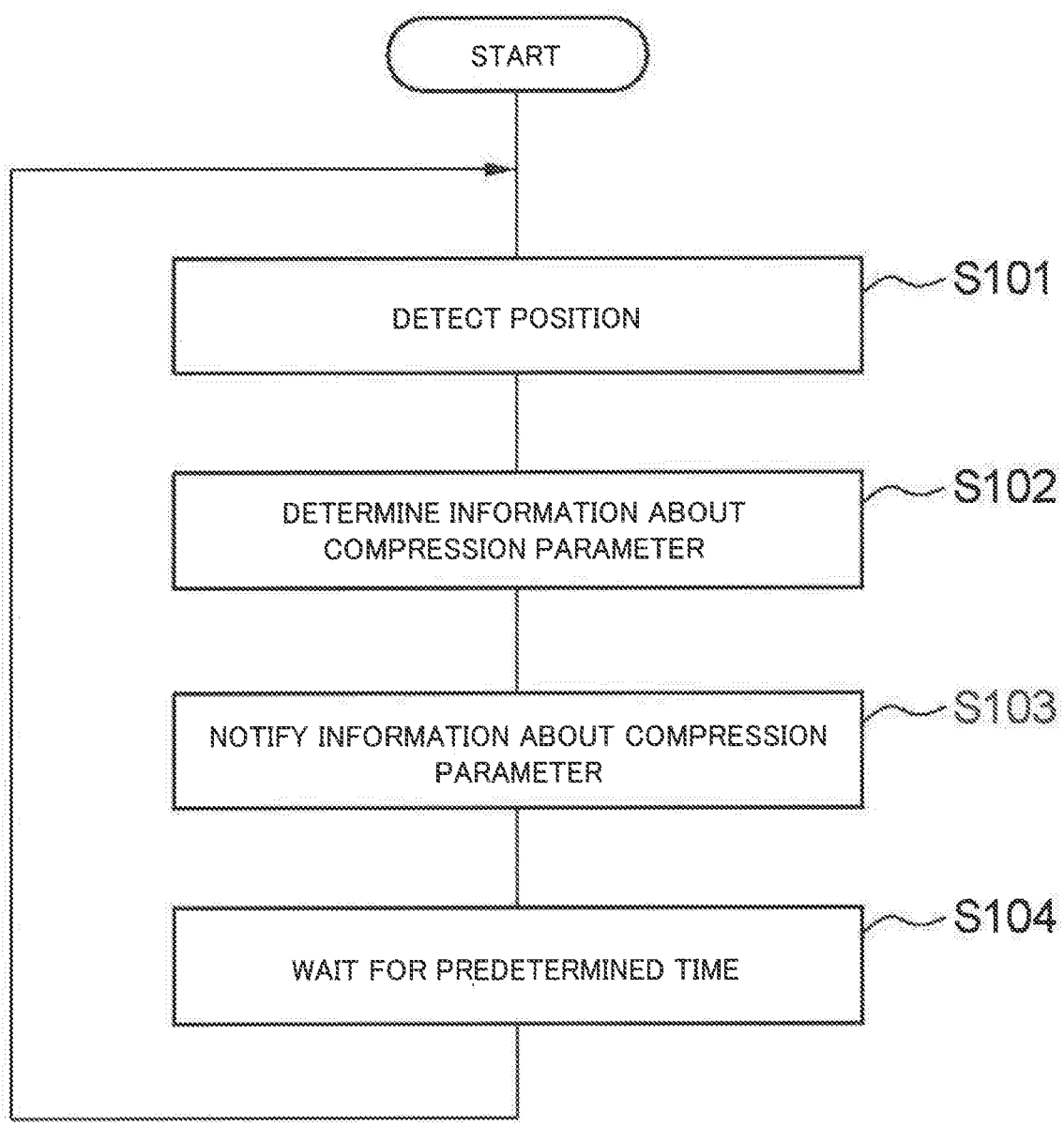
FIG. 3 is a flowchart illustrating an example of operation of a data encoding control device of the present invention.

FIG. 3 is a flow chart illustrating an example of the operation of data encoding control device 140. The operation of data encoding control device 140 will be described below with reference to FIG. 3.

First, data encoding control device 140 detects the position on the earth sensed by image capture device 150 of flying object 110 by detection unit 141 (step S101). Next, data encoding control device 140 determines the information about the compression parameter of the sensing data acquired through sensing performed by image capture device 150 based on the position detected by detection unit 141 by determination unit 142 (step S102). Next, data encoding control device 140 uses notification unit 143 to notify, to data encoding device 120, the compression parameter determined by determination unit 142 via communication device 170 to the (step S103). Next, data encoding control device 140 waits for a predetermined time (step S104), returns to step S101, and repeats the similar processing as the processing described above.

Figure 4:
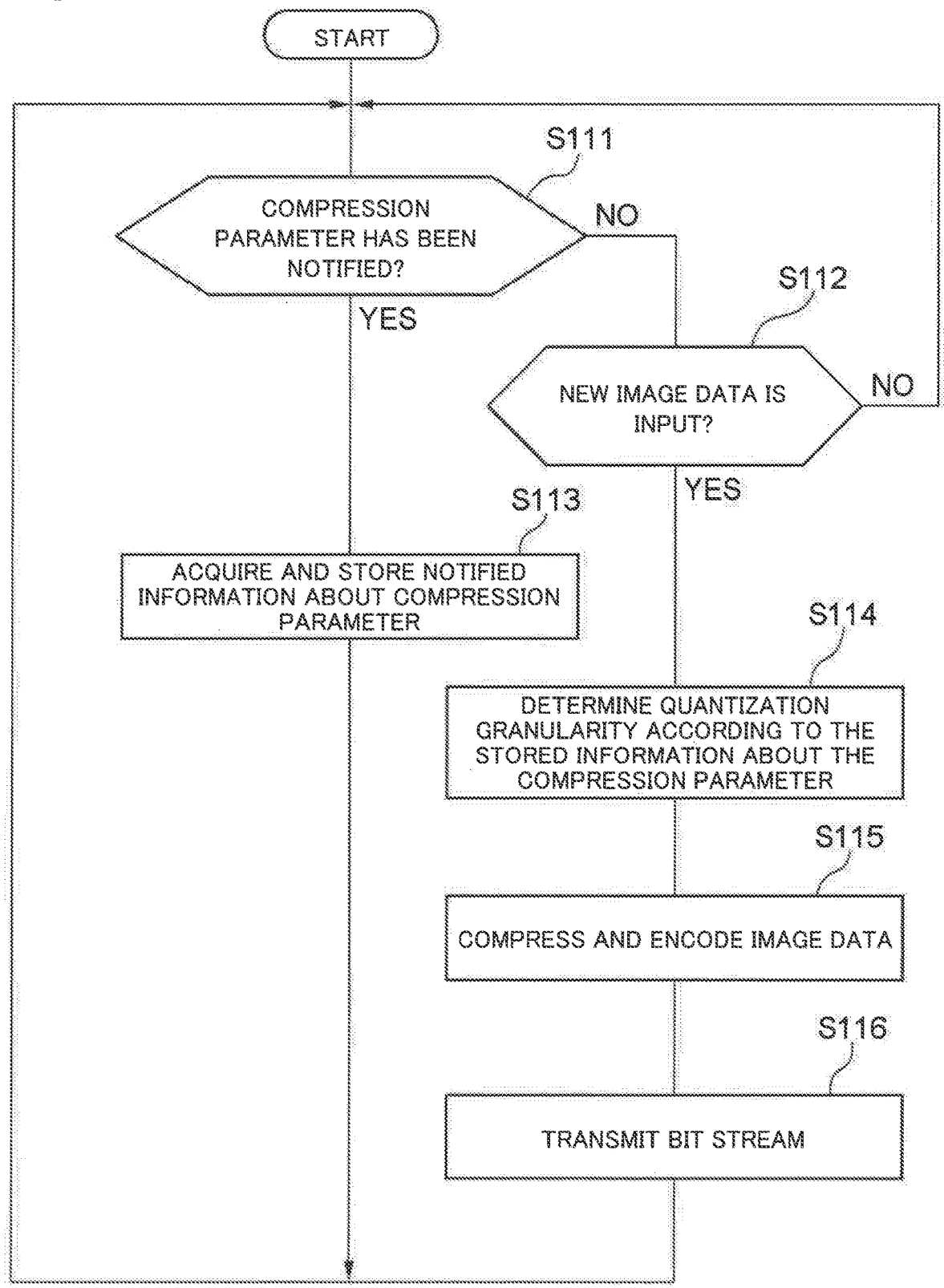
FIG. 4 is a flowchart illustrating an example of operation of the data encoding device of the present invention.

FIG. 4 is a flow chart illustrating an example of the operation of data encoding device 120. The operation of data encoding device 120 will be described below with reference to FIG. 4.

Data encoding device 120 determines whether or not information about the compression parameter has been notified from data encoding control device 140 via communication device 160 (step S111), and whether new image data is input from image capture device 150 (step S112). When data encoding device 120 detects that the information of the compression parameter is notified, acquisition unit 121 acquires the information of the notified compression parameter and stores the compression parameter therein (step S113). Acquisition unit 121 may overwrite the information of the old compression parameter being stored with the information of the latest compression parameter. Alternatively, acquisition unit 121 may add the current location information of flying object 110 and store the information of the notified compression parameter for a plurality of times.

On the other hand, when data encoding device 120 detects that new image data is input, encoding unit 122 determines the quantization granularity according to the information about the compression parameter stored in acquisition unit 121 (step S114). That is, encoding unit 122 determines the quantization granularity when the information about the compression parameter is the quantization granularity itself.

When the information about the compression parameter is image complexity, encoding unit 122 determines the quantization granularity from the image complexity and the output code amount using relational expression 1 or relational expression 2 of the quantization granularity, the image complexity, and the output code amount. Here, encoding unit 122 determines the output code amount to be substituted into the relational expression, for example, based on the restriction of the band of the wireless transmission path between flying object 110 and ground station 130. Encoding unit 122 may determine the quantization granularity according to the information about the compression parameter having position information closest to the current position of flying object 110 when information about a plurality of pieces of compression parameters are stored in acquisition unit 121. Next, data encoding device 120 compresses and encodes the input image data using the determined quantization granularity by encoding unit 122 (step S115). Next, data encoding device 120 transmits the bit stream generated by compression encoding performed with encoding unit 122 to ground station 130 via communication device 160 (step S116). Data encoding device 120 then returns to the processing of step S111.

Thus, according to the present example embodiment, the compression parameters of the image data acquired by image capture device 150 mounted on flying object 110 can be controlled from ground station 130. The reason for this is because data encoding control device 140 is configured to detect the position on the earth sensed with image capture device 150, determine, based on the detected position, the information about the compression parameter of the image data acquired by image capture device 150, and notify the information of the determined compression parameter to data encoding device 120 via communication device 170. In addition, the reason is because data encoding device 120 is configured to determine the quantization granularity according to the information of the compression parameter notified from data encoding control device 140 and perform compression encoding of the image data using the determined quantization granularity.

According to the present example embodiment, the image data acquired through sensing performed by image capture device 150 can be compressed and encoded using the quantization granularity corresponding to the position on the earth sensed by image capture device 150. The reason for this is the same as the above reason. Thus, according to the present example embodiment, the compression parameters of sensing data acquired through sensing performed by the sensor mounted on flying object 110 can be controlled from the ground. Therefore, it is unnecessary to implement the function of calculating information about the compression parameter on encoding unit 122 mounted on flying object 110 based on the image data input from image capture device 150. Generally, in order to calculate information about the compression parameter on the basis of image data acquired by image capture device 150 and perform compression encoding according to the calculated information about the compression parameter, it is necessary to temporarily store the non-compressed image in the buffer memory and analyze the stored non-compressed image, which incurs high costs, but in the present example embodiment, such costs can be suppressed.

Next, configuration and operation of data encoding system 100 according to the present example embodiment will be described in more detail.

Figure 5:
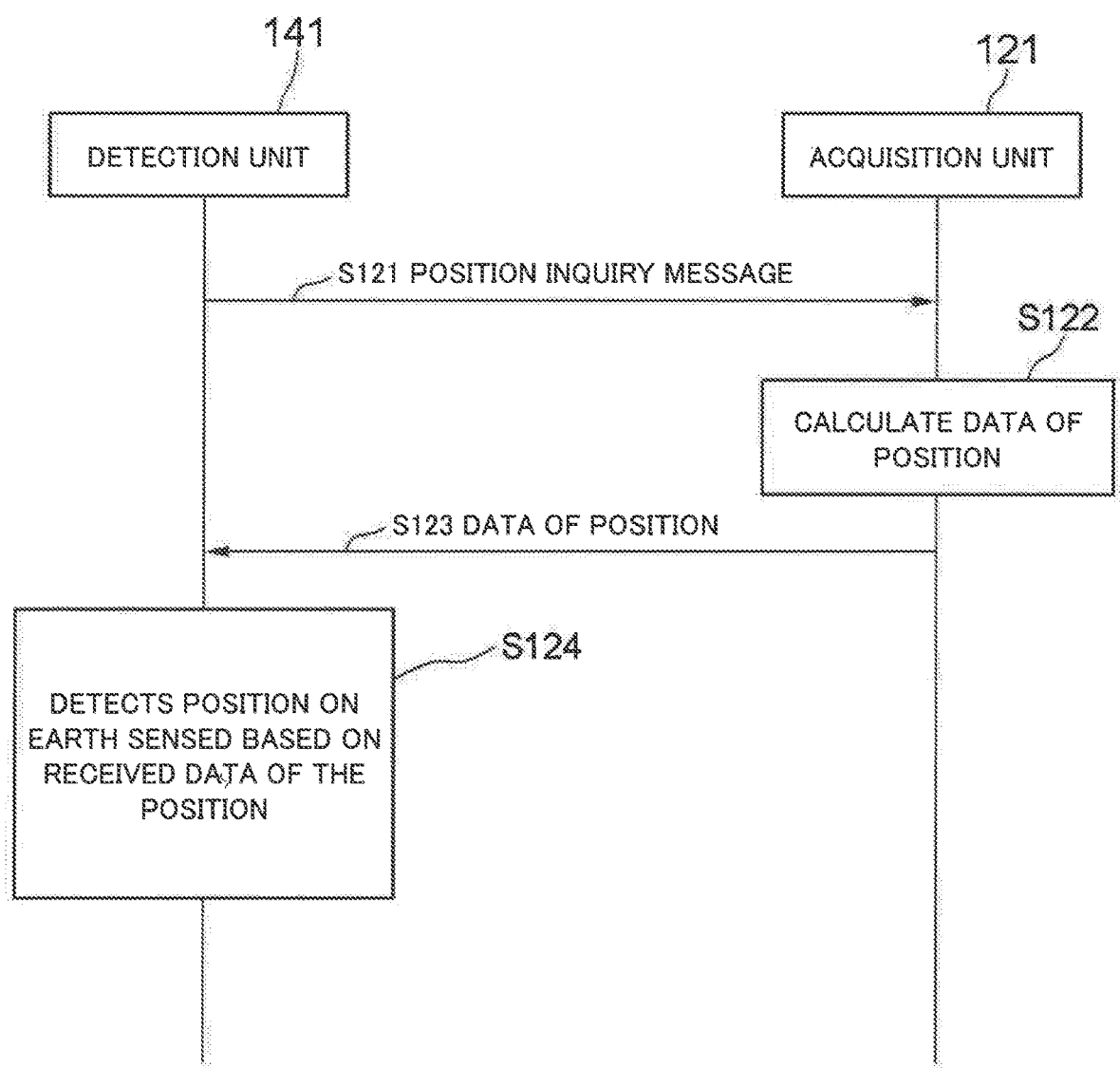
FIG. 5 is a sequence diagram illustrating an example of detecting a position on the earth where a detection unit of the data encoding control device according to the present invention is sensed by the image capture device.

FIG. 5 is a sequence diagram illustrating an example of detecting the position on the earth where detection unit 141 is sensed by image capture device 150.

Referring to FIG. 5, detection unit 141 sends a position inquiry message to acquisition unit 121 of flying object 110 via communication device 170 (S121). Upon receiving the position inquiry message via communication device 160, acquisition unit 121 calculates the position on the earth sensed by image capture device 150 (S122). For example, when flying object 110 is a satellite, acquisition unit 121 calculates the latitude and longitude on the earth sensed by image capture device 150 based on the current trajectory data and posture data being controlled by orbital posture control device (not illustrated), as data of the position. Alternatively, in addition to the trajectory data and the posture data, acquisition unit 121 calculates the latitude and longitude on the earth sensed by image capture device 150 based on the satellite's altitude with respect to the ground surface, the sensor angle of the satellite, the moving direction, as data of the position. Next, acquisition unit 121 sends data of the calculated position to detection unit 141 of ground station 130 via communication device 160 (S123). Upon receiving the data at the above position via communication device 170, detection unit 141 detects the position on the earth sensed by image capture device 150 based on the received data of the position (S124). That is, detection unit 141 regards, as it is, the data of the received position as the position on the earth sensed by image capture device 150.

In this way, according to detection unit 141 illustrated in FIG. 5, the position on the earth sensed by image capture device 150 can be acquired from flying object 110 carrying image capture device 150.

In FIG. 5, detection unit 141 sends a position inquiry message, and when acquisition unit 121 receives the position inquiry message, acquisition unit 121 sends data of the position to detection unit 141. However, acquisition unit 121 may be configured to periodically send data of the location to acquisition unit 121, and detection unit 141 may be configured to receive the data of the location to be sent periodically.

The method, by detection unit 141, of detecting the position on the earth sensed by image capture device 150 is not limited to the method described above with reference to FIG. 5. For example, when flying object 110 is an artificial satellite, the position (latitude, longitude) of the satellite which changes from moment to moment can be calculated by using the orbital element data of the satellite (epoch, inclination, right ascension of ascending node, eccentricity, perigee point, mean anomaly, mean motion, variation of mean motion). Since the position of the satellite and the position on the earth sensed by image capture device 150 mounted on the satellite are in a fixed relationship, the position (latitude, longitude) on the earth sensed by image capture device 150 can be estimated from the position of the satellite estimated by the calculation. According to this method, since detection unit 141 does not need to communicate with flying object 110, the amount of communication between flying object 110 and ground station 130 can be reduced.

Figure 6:
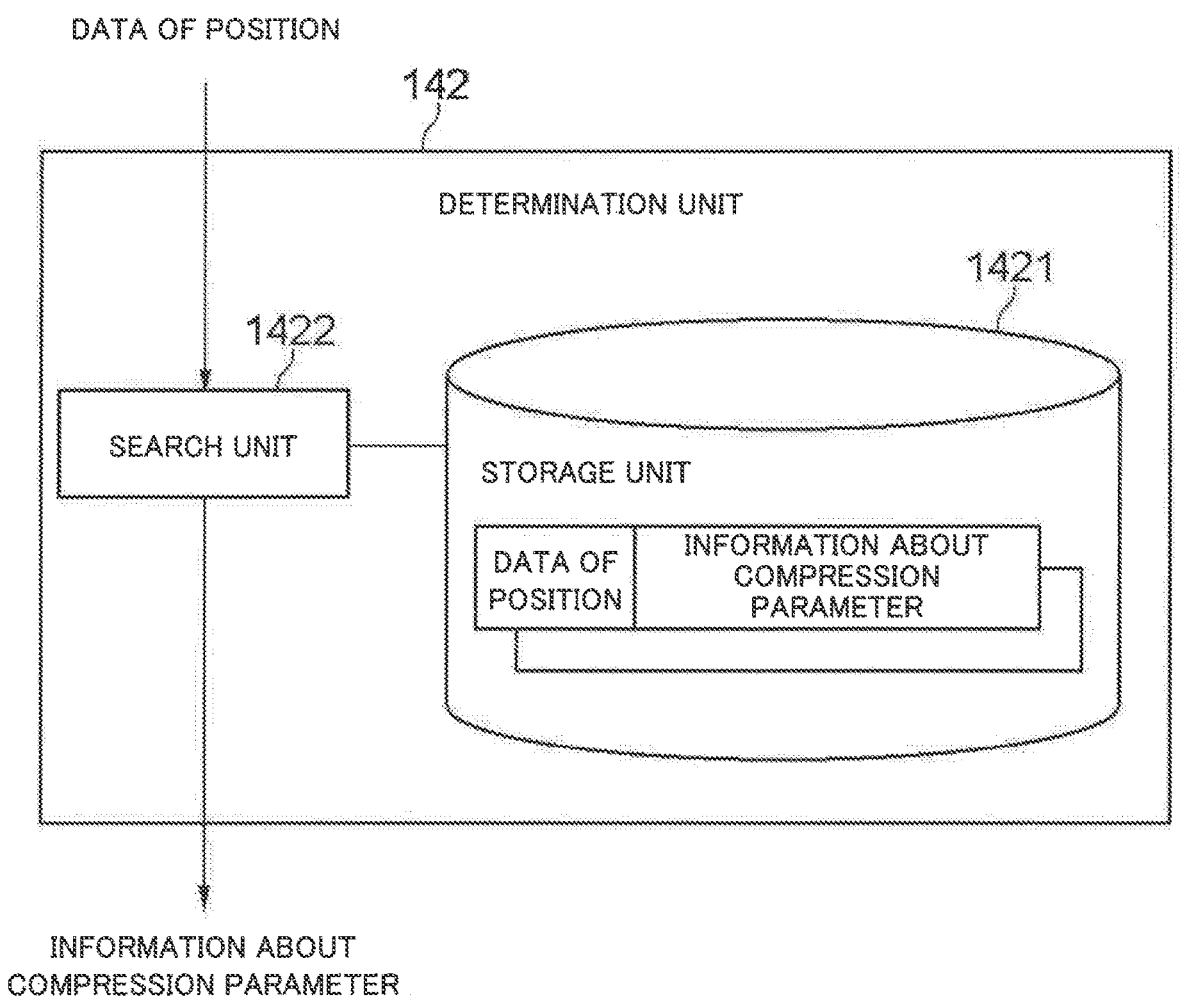
FIG. 6 is a block diagram illustrating an example of a determination unit of the data encoding control device of the present invention.

FIG. 6 is a block diagram illustrating an example of determination unit 142. Determination unit 142 in this example has storage unit 1421 and search unit 1422.

Storage unit 1421 stores a plurality of entries including a combination of data on the position on the earth sensed by image capture device 150 and information about compression parameters. Here, the information about the compression parameter of each entry may be determined based on at least one of the following examples. For example, geographical feature of the region on the earth specified by the data of the position of entry by an administrator, feature of an image acquired by image capture of a region on the earth specified by the data of the position of entry, data of a position of entry, purpose of an image acquired by capturing an image of a region of the earth specified by data of the position of entry, limitation of the storage capacity of the storage device mounted on flying object 110, limitation of the communication capacity from flying object 110 to ground station 130, communication possible time zone between flying object 110 and ground station 130 or a communication impossible time zone. For example, in an urban area where many buildings such as buildings exist, the image has a complicated texture. Therefore, the administrator sets the information of the compression parameter as coarse quantization granularity considering the size of the compressed data or image complexity with a high degree of complexity. On the other hand, in the case of sea or lake, a flat image is acquired, the administrator sets fine quantization granularity considering data size after compression, or sets image complexity with low complexity. In addition, by using the storage capacity of the storage device mounted on flying object 110 and using the communication capacity during transmission by a satellite orbiting the earth only when the satellite passes through ground station 130 installed on the ground (for each satellite system), it happens cases where both the complex region and the flat region are included in the range in which image capture is performed during circulation. In this case, in order to optimize the overall image quality, uniform compression parameters may be set as finely as possible within a range that satisfies the entire capacity constraint for both the complex region and the flat region. Alternatively, the information of the compression parameter of each entry may be information acquired by statistically acquiring information about the compression parameter used for the image with high evaluation among the images acquired through image capture of the area on the earth specified by the information about the position of entry in the past.

When data of the position on the earth sensed by image capture device 150 is input from detection unit 141, search unit 1422 searches storage unit 1421 for an entry having data at a position matching the data at that position. Then, search unit 1422 acquires information about the compression parameter from entry acquired by the search and outputs it to notification unit 143. Further, when there is no entry having data at the coinciding position, search unit 1422 searches storage unit 1421 for an entry having data closest to the position on the earth sensed by image capture device 150, acquires information about the compression parameter from entry, and outputs the information to notification unit 143. In addition, there is a case where there is no entry having data of a matching position. In this case, search unit 1422 searches storage unit 1421 for an entry having the data of the top N positions closer to the position on the earth sensed by image capture device 150, and from the N entries, search unit 1422 acquires information about the compression parameter, generates information about one compression parameter from the information about the N compression parameters, and outputs the compression parameter to notification unit 143. As a method for generating information about one compression parameter from information of N compression parameters, there are methods such as acquiring an average, finding a minimum value, acquiring a maximum value, acquiring an intermediate value. Alternatively, search unit 1422 may use information about a predetermined compression parameter when there is no entry with data at the matching position. As the information of the predetermined compression parameter, for example, a statistical mean value of complexity of the global earth can be used.

In this way, according to determination unit 142 illustrated in FIG. 6, the information of compression parameters according to the position on the earth sensed by image capture device 150 can be automatically determined.

Figure 7:
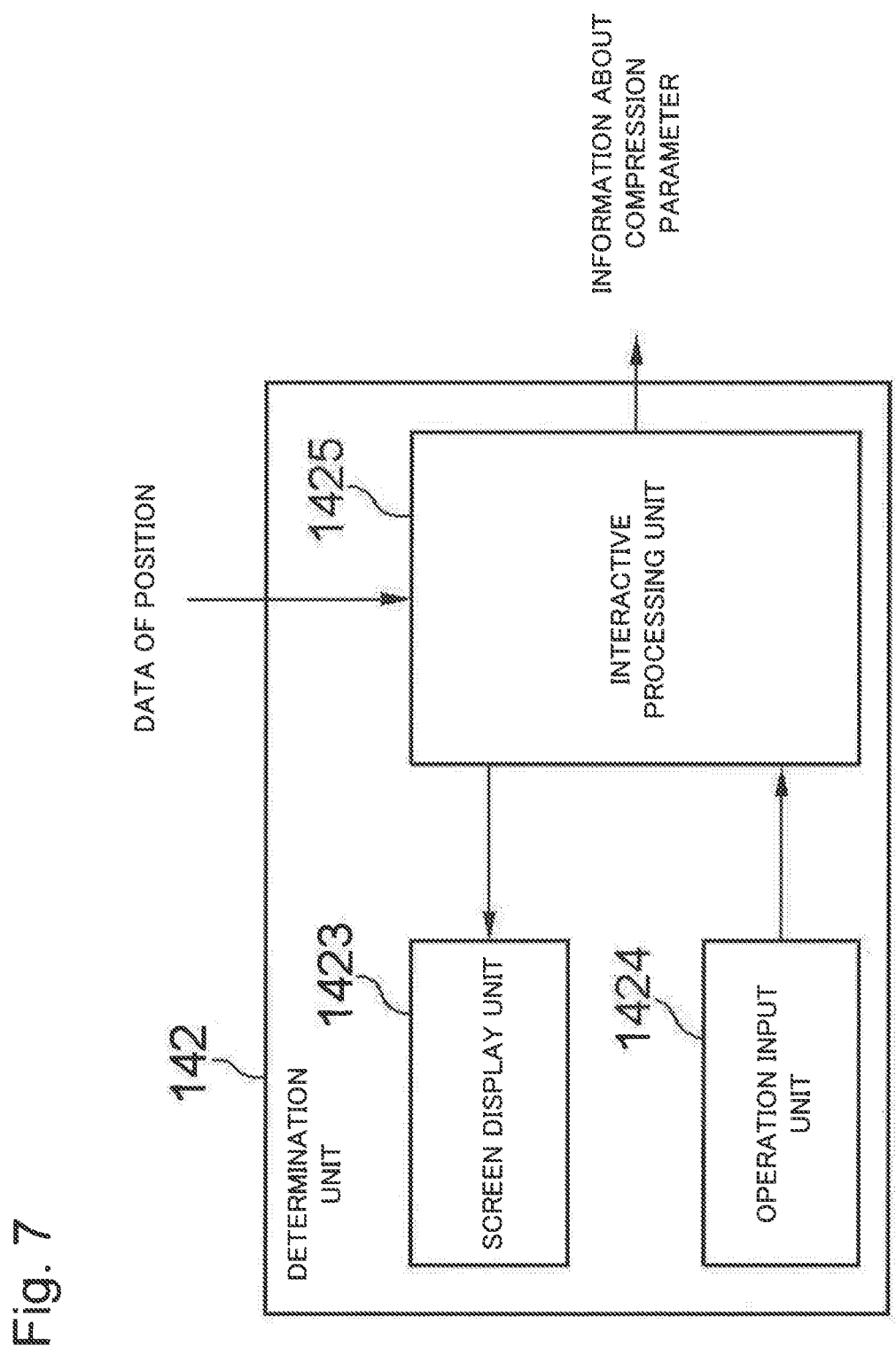
FIG. 7 is a block diagram illustrating another example of a determination unit of a data encoding control device according to the present invention.

FIG. 7 is a block diagram illustrating another example of determination unit 142. Determination unit 142 in this example includes screen display unit 1423 such as a liquid crystal display, operation input unit 1424 such as a keyboard and a mouse, and interactive processing unit 1425. When interactive processing unit 1425 receives data on the position on the earth sensed by image capture device 150 from detection unit 141, interactive processing unit 1425 displays data of the position on screen display unit 1423. For example, interactive processing unit 1425 textually displays the latitude and longitude on the earth sensed by image capture device 150.

Alternatively, interactive processing unit 1425 displays on screen display unit 1423 a map indicating the position on the earth sensed by image capture device 150 with a pointer or the like. Interactive processing unit 1425 is configured to acquire the information about the compression parameter input from operation input unit 1424 and output the information to notification unit 143.

In this way, according to determination unit 142 illustrated in FIG. 7, the information about the compression parameter corresponding to the position on the earth sensed by image capture device 150 can be determined through interactive processing with the administrator.

Determination unit 142 is not limited to the example described above, and various additions and modifications are possible. For example, determination unit 142 may be configured to determine information about image compression parameters (image complexity, or image complexity) acquired through sensing performed by image capture device 150 based on additional information and the position on the earth sensed by image capture device 150. Here, the additional information is constituted by at least one of information about image size, sensing time, sensing direction, sensing altitude, sensor type, weather, temperature, humidity, particulate matter (PM) 2.5 density, encoding scheme, generated code amount per pixel.

Next, a specific example of entry of storage unit 1421 in determination unit 142 illustrated in FIG. 6 will be explained.

Entry E1 illustrated in FIG. 8 includes a combination of data of the position constituted by latitude and longitude and image complexity used in the MPEG-2 TM5 system. The latitude and the longitude are those of representative points (such as the center and the upper left corner) of the area on the earth sensed by image capture device 150.

Entry E2 illustrated in FIG. 8 includes a combination of data of the position including position Identifier (ID) and image complexity. In this example, in the case where the flying object always returns on a predetermined orbit like a satellite, an ID indicating the point on the route of the flying object is recorded instead of the latitude and the longitude on the ground.

Entry E3 illustrated in FIG. 8 includes a combination of data of the position constituted by latitude and longitude and image complexity represented by two-dimensional vector. This entry E3 is for the case where the above-mentioned relational expression 2 is used.

Entry E4 illustrated in FIG. 8 includes a combination of data of the position of latitude and longitude, quantization granularity parameter and generated code amount per pixel. This entry E3 records quantization granularity itself as compression parameter, not image complexity. In addition, the generated code amount per pixel is also recorded.

Entry E5 illustrated in FIG. 9 includes a combination of data of the positions including a plurality of pairs of latitude and longitude pairs and image complexities. In this entry E5, it is assumed that the image area image-captured by image capture device 150 is a rectangle and the upper direction on the image is aligned to the north, and the position (latitude and longitude) of the two end points (for example, upper left and lower right) on the diagonal line of the image area are recorded.

Entry E6 illustrated in FIG. 9 includes a combination of data of the position of a plurality of end points, transformation matrix, and image complexity. This entry E6 is for a case where the image area image-captured by image capture device 150 is a rectangle and the upper direction on the image is not necessarily aligned northward. Entry E6 records the two end points on the image area as the image coordinates and then records the transformation determinant to the ground coordinate system. The transformation matrix equation can be expressed as, for example, a 3×2 determinant A representing a two-dimensional linear transformation and parallel transformation. However, assuming that the image coordinate of one of the two end points is, for example, (0, 0), only one end point may be recorded in entry E6. As a transformation matrix, it may be possible to use a method of recording it as a 4×3 determinant handling three-dimensional coordinate system transformation according to the description method of the Model Transformation Tag parameter in GeoTiff format. Also, as a manner of indicating the range, any other expression method may also be used.

Entry E7 illustrated in FIG. 9 includes a combination of data of the position of latitude and longitude, image complexity per given unit, and image size. Since the output code amount varies depending on the image size even with the image of the same complexity, entry E7 sets the image complexity per prescribed unit and records the image size together.

Entry E8 illustrated in FIG. 9 includes a combination of data of the position of latitude and longitude, image capture time, date and time (season), and image complexity. Storage unit 1421 stores a plurality of entries E8 having the same position information but different image capture time and date and time (season) from image complexity. Search unit 1422 searches for entry E8 having image capture time and date and time (season) that matches with the position detected by detection unit 141 and matches the current time, and acquires the image complexity from entry E8. Generally, when the image capture time and the date and time (season) are different, the acquired image is different and is considered to have different image complexity. By using entry E8, it is possible to determine compression parameters according to the image capture time and the date and time (season).

Entry E9 illustrated in FIG. 10 includes a combination of data of the position of latitude and longitude, the altitude of flying object 110, image capture angle (elevation angle, azimuth angle), and image complexity. Storage unit 1421 stores a plurality of entries E9 having the same position information but different combinations of the altitude of flying object 110 and the image capture angle (elevation angle, azimuth angle) and the image complexity. Search unit 1422 searches entry E9 that matches the altitude detected by detection unit 141 and that has a combination of altitude and angle (elevation angle, azimuth angle) of image capture matching a combination of the current altitude of the current flying object 110 and the angle of the image capture (elevation angle, azimuth angle), and acquires the image complexity from entry E9. Determination unit 142 acquires the altitude of the current flying object 110 and the angle of the image capture, for example, as follows. First, acquisition unit 121 of flying object 110 acquires the altitude of the current flying object 110 and the angle of the image capture from the altimeter (not illustrated) of flying object 110 and image capture device 150. Next, when detection unit 141 of ground station 130 acquires data of the position from flying object 110, detection unit 141 of ground station 130 simultaneously acquires the altitude and angle of the image capture and notifies the altitude and angle of the image capture to determination unit 142.

Generally, even when image capture is performed on the same place, when image capture is performed from different directions, the acquired image is different and is considered to have different image complexity. Furthermore, instead of image capture from a flying object that passes through a fixed altitude like a satellite, when image capture is performed from a flying object whose altitude changes like an aircraft, it is considered that images acquired from different altitudes are different and have image complexities. By using entry E9, the compression parameters can be determined according to the altitude of flying object 110 and the angle of the image capture.

Entry E9 includes two pieces of additional information, altitude and angle of image capture, but entry E9 may include only one of altitude and angle of image capture. Also, by changing the telephoto magnification of the lens, the image capture may be performed upon changing image capture range and resolution per pixel, and in that case, when these are different, the acquired image is different and it is considered to the acquired image has a different resolution. Therefore, the elements of the image capture range and the resolution per pixel may be added to entry E9.

Entry E10 illustrated in FIG. 10 includes a combination of data of the position, latitude and longitude, sensor ID, and image complexity. The sensor ID is an ID uniquely indicating the combination of flying object 110 and image capture device 150. Storage unit 1421 stores a plurality of entries E10 having the same position information, but different combinations of sensor ID and image complexity. Search unit 1422 searches entry E10 that matches the position detected by detection unit 141 and that has a sensor ID matching the sensor ID of the current flying object 110, and acquires the image complexity from entry E10. For example, determination unit 142 acquires the sensor ID as follows. First, acquisition unit 121 of flying object 110 acquires a sensor ID related to a combination of flying object 110 and image capture device 150. Next, when detection unit 141 of ground station 130 acquires the data of the position from flying object 110, detection unit 141 of ground station 130 simultaneously acquires the sensor ID and notifies the sensor ID to determination unit 142.

Generally, even when the position is the same, when the features of the image capture system (target wavelength band, sensor sensitivity, flight altitude, etc.) are different, the resultant image sharpness, pixel value range, image capture content as image are different, and it is considered that the resultant images have different image complexity. By using entry E10, storage unit 1421 can be shared by a plurality of flying objects 110 whose image capture system features differ, and in addition, it is possible to determine the compression parameter according to the feature of image capture device 150 possessed by flying object 110.

Entry E11 illustrated in FIG. 10 includes a combination of latitude and longitude data, weather, temperature, humidity, and image complexity. Storage unit 1421 stores a plurality of entries E11 having the same position information but different combinations of weather, temperature, humidity and image complexity. Search unit 1422 searches for entry E11 that matches the position detected by detection unit 141 and that has a combination of weather and temperature and humidity that matches the current combination of weather and temperature and humidity of flying object 110, and acquires the image complexity from entry E11. For example, determination unit 142 acquires weather, temperature and humidity as follows. First, acquisition unit 121 of flying object 110 acquires the weather, temperature and humidity around flying object 110 by means of a not-illustrated instrument mounted on flying object 110. Next, when detection unit 141 of ground station 130 acquires data of the position from flying object 110, detection unit 141 of ground station 130 simultaneously acquires weather, temperature and humidity, and notifies the weather, temperature and humidity to determination unit 142.

Generally, even when the position is the same, when the weather, temperature and humidity are different, the sharpness of the resultant image will be different, and it is considered to the image has different complexity. By using entry E11, compression parameters can be determined according to the weather, temperature and humidity around flying object 110. Here, three pieces of additional information, i.e., weather, temperature and humidity are described, but other information such as PM 2.5 density is also conceivable.

Entry E12 illustrated in FIG. 10 includes a combination of latitude and longitude data, encoding scheme ID, quantization granularity parameter, and generated code amount per pixel. The encoding scheme ID is an ID uniquely indicating an encoding scheme such as JPEG (Joint Photographic Experts Group), MPEG-2, HEVC (High Efficiency Video Coding). Storage unit 1421 stores a plurality of entries E12 which have the same position information but different combinations of encoding scheme ID and quantization granularity parameters and generated code amount per pixel. Search unit 1422 searches for entry E12 that matches the position detected by detection unit 141 and that has an encoding scheme ID matching the encoding scheme ID of flying object 110, and acquires the quantization granularity parameter and generated code amount per pixel from entry E12. Determination unit 142 determines an encoding scheme ID of flying object 110 with reference to a list storing, for example, the encoding scheme ID for each image capture device 150 of flying object 110. By using entry E12, storage unit 1421 can be shared by a plurality of flying objects 110 having different encoding schemes, and it is also possible to determine the compression parameter according to the encoding scheme of flying object 110.

The configuration of the above-described entry is an example. Any combination of position information and additional information other than information about the compression parameter (such as image complexity) is possible.

Figure 11:
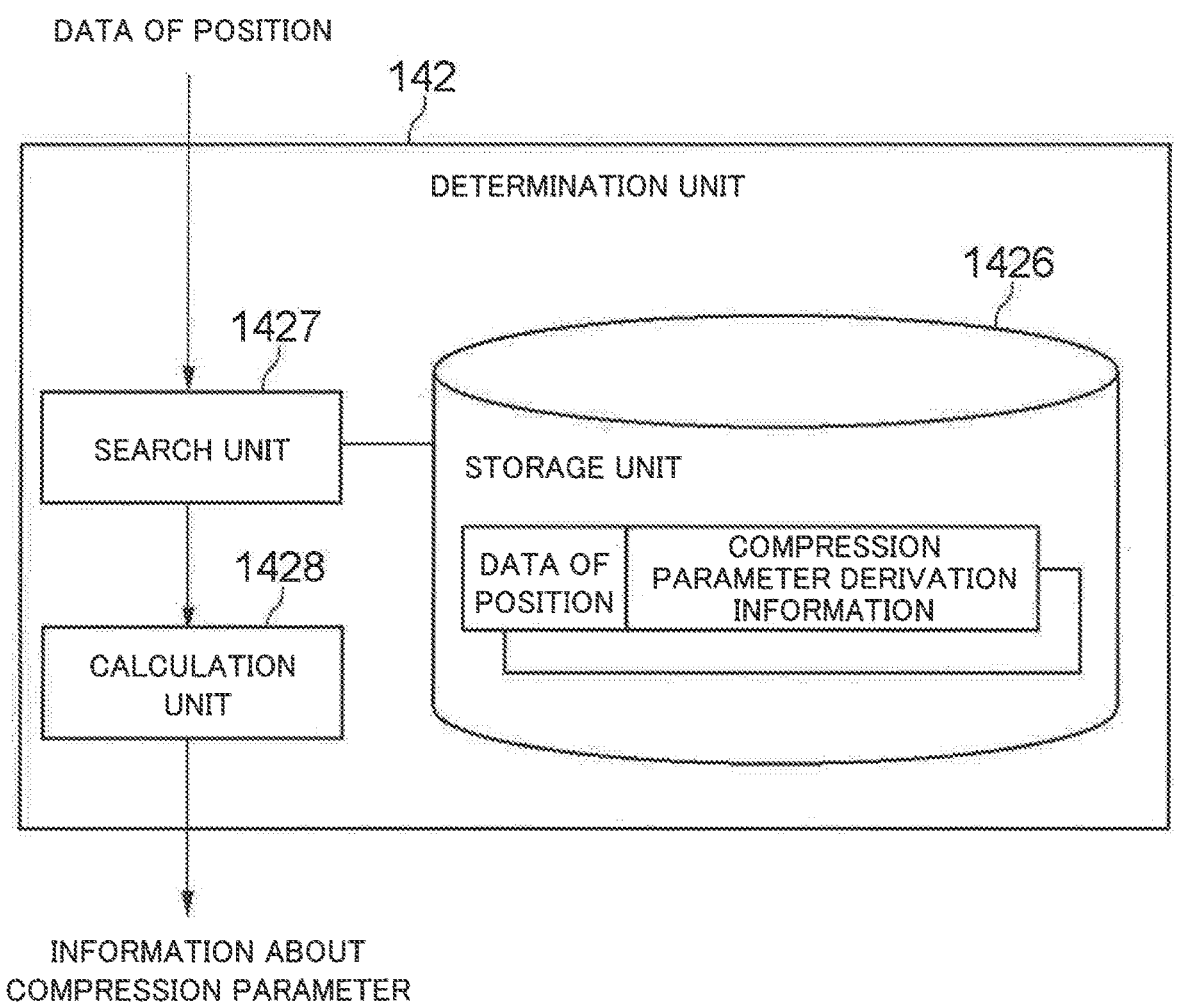
FIG. 11 is a block diagram illustrating another example of the determination unit of the data encoding control device according to the present invention.

FIG. 11 is a block diagram illustrating another example of determination unit 142. Determination unit 142 in this example has storage unit 1426, a search unit 1427, and a calculation unit 1428.

Storage unit 1426 stores a plurality of entries including combinations of data of the position on the earth sensed by image capture device 150 and information for deriving information about compression parameters (hereinafter referred to as compression parameter derivation information). Here, the compression parameter derivation information of each entry may be, for example, a relationship between target compression rate and output code amount. Alternatively, the compression parameter derivation information of each entry may be, for example, a relationship between quantization granularity and output code amount. The compression parameter derivation information of each entry may be based on the encoding result acquired by the flying object related to the current encoding processing. The compression parameter derivation information of each entry may be based on the result of separately processing the image acquired by the flying object related to the current encoding processing. The compression parameter derivation information of each entry may be based on the result of processing the image acquired by another flying object. Still alternatively, a combination of any of the above may be employed.

When search unit 1427 receives data of the position on the earth sensed by image capture device 150 from detection unit 141, search unit 1427 searches storage unit 1426 for an entry having data of position matching the received data of the position. Search unit 1427 acquires the compression parameter derivation information from entry acquired by the search and outputs the compression parameter to calculation unit 1428. When there is no entry having data of matching position, search unit 1427 searches storage unit 1426 for an entry closest to the position on the earth sensed by image capture device 150, and from that entry, search unit 1427 acquires the compression parameter derivation information and outputs the compression parameter derivation information to calculation unit 1428. Other than the above, there may be a case where there is no entry with data of matching position. In this case, search unit 1427 searches storage unit 1426 for the top N entries closest to the position on the earth sensed by image capture device 150, acquires the compression parameter derivation information from the N entries, generates one compression parameter derivation information from the N pieces of compression parameter derivation information, and outputs the compression parameter derivation information to calculation unit 1428. As a method for generating one compression parameter derivation information from N pieces of compression parameters derivation information, there are methods such as averaging, acquiring a minimum value, acquiring a maximum value, acquiring an intermediate value. Alternatively, search unit 1427 may use predetermined compression parameter derivation information when there is no entry with data of matching position. As the predetermined compression parameter derivation information, for example, information for deriving a statistical mean value of complexity of the entire earth can be used.

Calculation unit 1428 calculates the information about the compression parameter from the compression parameter derivation information input from search unit 1427, and notifies the information about the compression parameter to notification unit 143.

For example, when the compression parameter derivation information is the relationship between the quantization granularity and the output code amount and the information of the compression parameter is the image complexity, calculation unit 1428 calculates image complexity from the quantization granularity and output the code amount using relational expression 1 or relational expression 2 as described above.

Further, for example, when the compression parameter derivation information is the relationship between the target compression rate and the output code amount and the information about the compression parameter is image complexity, for example, calculation unit 1428 calculates the image complexity from the relationship between the target compression rate and the image code amount using relational expression 3 below.

$$X_{act} = (S_{act}/O) * (X_{est}/r_{est}) \qquad (3)$$

In relational expression 3, $X_{act}$ denotes image complexity, $S_{act}$ denotes the actual output code amount acquired by compression, O denotes the amount of data before compression, $X_{est}$ denotes the estimated complexity, $r_{est}$ denotes the target compression rate, and the right side denotes a relationship between the target compression rate and the output code amount.

In the above description, the sensing data is image, but the present example embodiment can be applied to sensing data other than image, for example, radar waveform data, sound, other arbitrary earth observation data.

Also, in the above description, encoding unit 122 mounted on flying object 110 performs compression encoding of image data based on the compression parameters received from ground station 130. However, the present example embodiment can be applied even when encoding unit 122 mounted on flying object 110 has a function of calculating information of compression parameters based on image data input from image capture device 150. In that case, encoding unit 122 mounted on flying object 110 may be configured to perform compressed encoding of image data, based on the compression parameter (for example, image complexity) calculated from the image data input from image capture device 150 and the compression parameter (for example, image complexity) received from ground station 130.

Second Example Embodiment

Next, the data encoding system according to the second example embodiment of the present invention will be explained.

Figure 12:
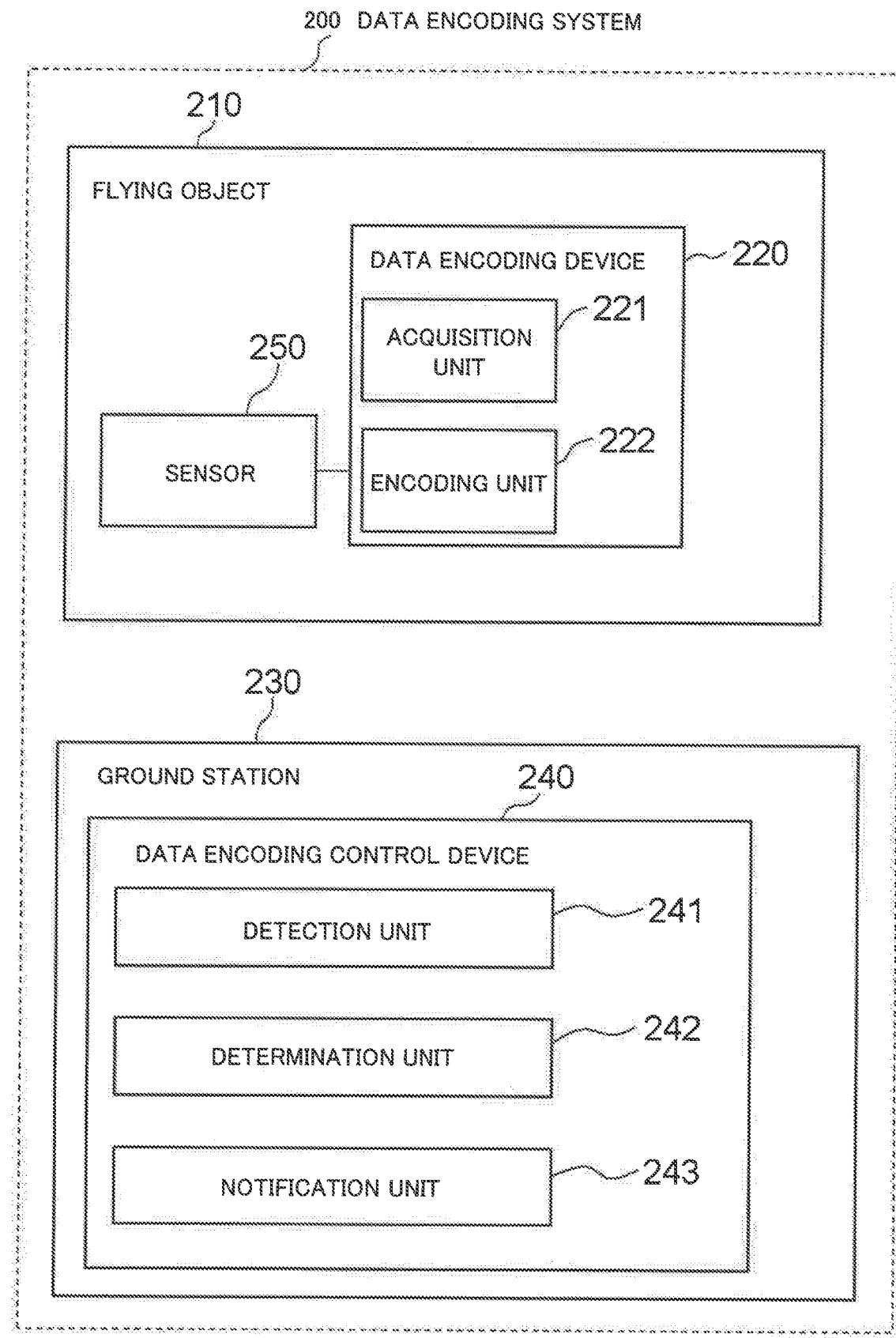
FIG. 12 is a block diagram of the data encoding system according to the first example embodiment of the present invention.

FIG. 12 is a block diagram of data encoding system 200 according to the second example embodiment of the present invention. Data encoding system 200 includes data encoding device 220 mounted on flying object 210 and data encoding control device 240 installed in ground station 230 capable of mutually communicating with flying object 210.

Data encoding device 220 is connected to sensor 250 installed in flying object 210. Data encoding device 220 includes an acquisition unit 221 and an encoding unit 222. Acquisition unit 221 has a function of acquiring information about the notified compression parameter from Data encoding control device 240. Encoding unit 222 has a function of compressing the sensing data acquired through sensing performed by sensor 250 according to the information about the compression parameter acquired by acquisition unit 221.

Data encoding control device 240 includes detection unit 241, determination unit 242, and notification unit 243. Detection unit 241 has a function of detecting the position on the earth sensed by sensor 250. Determination unit 242 has a function of determining information of compression parameters of sensing data acquired through sensing with sensor 250 based on the position detected by detection unit 241. Notification unit 243 has a function of notifying data encoding device 220 of the information about the compression parameter determined by determination unit 242.

Data encoding system 200 configured as described above operates as follows.

Data encoding control device 240 detects, with detection unit 241, the position on the earth sensed by sensor 250 mounted on flying object 210. Next, according to determination unit 242, Data encoding control device 240 determines the information about the compression parameter of the sensing data acquired through sensing with sensor 250 based on the position detected by detection unit 241. Next, Data encoding control device 240 notifies, with notification unit 243, the information about the compression parameter determined by determination unit 242 to data encoding device 220. Data encoding control device 240 repeats the above-described operation every fixed time or every time flying object 210 moves a certain distance.

Data encoding device 220 acquires, with acquisition unit 221, the information of the compression parameter notified from Data encoding control device 240 of ground station 230. Next, data encoding device 220 compresses, the encoding unit 222, the sensing data acquired through sensing performed by sensor 250 according to the information about the compression parameter acquired by acquisition unit 221. Data encoding device 220 transmits the compressed sensing data to ground station 230, or stores the compressed sensing data to the storage device mounted on flying object 210.

Data encoding system 200 according to the present example embodiment is configured and operates as described above, and therefore, data encoding system 200 according to the present example embodiment can control compression parameters of sensing data acquired by sensing with sensor 250 mounted on flying object 210 from the ground. The reason for this is because Data encoding control device 240 detects the position on the earth sensed by sensor 250, and determines, based on the detected position, information about the compression parameter of the sensing data acquired by sensing performed with sensor 250, and notifies the information about the determined compression parameter to data encoding device 220. Furthermore, the reason for this is because data encoding device 220 acquires the information about the compression parameter notified from Data encoding control device 240 and compresses the sensing data acquired through sensing performed with sensor 250 according to the information of the acquired compression parameter.

Although the present invention has been described with reference to several example embodiments, the present invention is not limited to the above examples, and various additions and modifications are possible within the scope of the present invention.

For example, storage unit 1421 in FIG. 6 or storage unit 1426 in FIG. 11 may be configured so that, each time compressed image data is received from the flying object, an entry generated based on the received compressed image data is added. Also, when the information about the compression parameter or the compression parameter derivation information of the same or adjacent position already exists, it may be possible to employ methods such as, e.g., simply replacing the information about the compression parameter or the compression parameter derivation information with the latest value, updating the information about the compression parameter or the compression parameter derivation information by acquiring the average value of the latest value and old value, or updating the information about the compression parameter or the compression parameter derivation information with, instead of, such as, an average, a weighted average weighted by time.

The information about the compression parameter is not limited to quantization granularity or image complexity, and may be other parameters such as compression rate.

This application claims priority based on Japanese Patent Application No. 2016-057052 filed on Mar. 22, 2016, the disclosure of which is incorporated herein in its entirety.

Some or all of the above example embodiments may also be described as the following supplementary notes, but are not limited to the following.

(Supplementary Note 1)

A data encoding system including a data encoding device mounted on a flying object having a sensor, and a data encoding control device installed in a ground station capable of communicating with the flying object wherein the data encoding control device includes:

detection unit that detects a position on earth sensed by the sensor;

determination unit that determines information about a compression parameter of sensing data acquired through sensing performed by the sensor, based on the detected position; and notification unit that notifies, to the data encoding device, the information about the determined compression parameter;

wherein the data encoding device includes:

acquisition unit that acquires the information about compression parameter notified from the data encoding control device; and encoding unit that compresses sensing data acquired through sensing performed by the sensor, according to the acquired information about the compression parameter.

(Supplementary Note 2)

The data encoding system according to Supplementary note 1, wherein the acquisition unit is configured to notify, to the data encoding device, data of a position on earth that is sensed by the sensor, and the detection unit is configured to detect, with the sensor, a position on earth sensed by the sensor, based on the notified data of the position.

(Supplementary Note 3)

The data encoding system according to Supplementary note 1 or 2, wherein the determination unit is configured to determine information about the compression parameter by referring to storage unit storing, in an associated manner, the position and information about the compression parameter or information for deriving the information about the compression parameter.

(Supplementary Note 4)

The data encoding system according to Supplementary note 1 or 2, wherein the determination unit is configured to inquire of a user about information about the compression parameter related to the position, and determine the information about the compression parameter, based on a response from the user in reply to the inquiry.

(Supplementary Note 5)

The data encoding system according to any one of Supplementary notes 1 to 4, wherein the determination unit is configured to determine the information of the compression parameter related to sensing data acquired through sensing performed with the sensor based on the detected position and information which is constituted by at least one of image size, sensing time, sensing direction, sensing altitude, sensor type, weather, temperature, humidity, PM 2.5 density, encoding scheme, and generated code amount per pixel.

(Supplementary Note 6)

The data encoding system according to any one of Supplementary notes 1 to 5, wherein the information about the compression parameter is granularity of quantization.

(Supplementary Note 7)

The data encoding system according to any one of Supplementary notes 1 to 5, wherein the information about the compression parameter is complexity of the sensing data.

(Supplementary Note 8)

The data encoding system according to any one of Supplementary notes 1 to 7, wherein the sensing data is an image.

(Supplementary Note 9)

A data encoding device mounted on a flying object having a sensor. The device includes:

a data encoding unit that acquires information about a compression parameter from a data encoding control device installed in a ground station capable of communicating with the flying object, the data encoding control device detecting a position on earth sensed by the sensor and determining the compression parameter of sensing data acquired through sensing performed with the sensor, based on the detected position, the data encoding control device notifying the determined information about the compression parameter to the data encoding device; and encoding unit that compresses the sensing data acquired through sensing performed with the sensor, based on the acquired information about the compression parameter.

(Supplementary Note 10)

A data encoding control device installed in a ground station capable of communicating with a flying object carrying a sensor and a data encoding device compressing sensing data acquired through sensing performed by the sensor, the data encoding control device including:

detection unit that detects a position on earth sensed by the sensor;

determination unit that determines information about a compression parameter of the sensing data acquired through sensing performed by the sensor, based on the detected position; and notification unit that notifies, to the data encoding device, the information about the determined compression parameter.

(Supplementary Note 11)

A data encoding method executed by a data encoding device mounted on a flying object having a sensor, the data encoding method including:

acquiring information about a compression parameter from a data encoding control device installed in a ground station capable of communicating with the flying object, the data encoding control device detecting a position on earth sensed by the sensor and determining the compression parameter of sensing data acquired through sensing performed with the sensor, based on the detected position, the data encoding control device notifying the determined information about the compression parameter to the data encoding device; and compressing the sensing data acquired through sensing performed with the sensor, based on the acquired information about the compression parameter.

(Supplementary Note 12)

A data encoding control method executed by a data encoding control device installed in a ground station capable of communicating with a flying object carrying a sensor and a data encoding device compressing sensing data acquired through sensing performed by the sensor, the data encoding control method including:

detecting a position on earth sensed by the sensor;

determining information about a compression parameter of the sensing data acquired through sensing performed by the sensor, based on the detected position; and notifying, to the data encoding device, the information about the determined compression parameter.

(Supplementary Note 13)

A recording medium storing a program causing a computer mounted on a flying object having a sensor to function as:

acquisition unit that acquires information about a compression parameter from a data encoding control device installed in a ground station capable of communicating with the flying object, the data encoding control device detecting a position on earth sensed by the sensor and determining the compression parameter of sensing data acquired through sensing performed with the sensor, based on the detected position, the data encoding control device notifying the determined information about the compression parameter to the computer; and encoding unit that compresses the sensing data acquired through sensing performed with the sensor, in accordance with the acquired information about the compression parameter.

(Supplementary Note 14)

A recording medium storing a program causing a computer installed in a ground station capable of communicating with a flying object carrying a sensor and a data encoding device compressing sensing data acquired through sensing performed by the sensor, to function as:

detection unit that detects a position on earth sensed by the sensor;

determination unit that determines information about a compression parameter of the sensing data acquired through sensing performed by the sensor, based on the detected position; and notification unit that notifies, to the data encoding device, the information about the determined compression parameter.

INDUSTRIAL APPLICABILITY

The present invention can be used to compression parameters are controlled from the ground when data sensed by a sensor mounted on a flying object such as a satellite or an airplane are compressed by an encoding device mounted on the flying object.

Although the present invention has been described with reference to each example embodiment, the present invention is not limited to the above example embodiments. Various changes that those skilled in the art can understand within the scope of the present invention can be applied to the configuration and details of the present invention.

REFERENCE SIGNS LIST

100 . . . Data encoding system
101 . . . Information processing device
102 . . . Storage unit
103 . . . Calculation processing unit
104 . . . Program 110 . . . Orbiting vehicle
120 . . . Data encoding device
121 . . . Acquisition unit
122 . . . Encoding unit
130 . . . Ground station
140 . . . Data encoding control device
141 . . . Detection unit
142 . . . Determination unit
143 . . . Notification unit
150 . . . Image capture device
160 . . . Communication device
170 . . . Communication device
180 . . . Remote sensing data storage device
1421 . . . Storage unit
1422 . . . Search unit
1423 . . . Screen display unit
1424 . . . Operation input unit
1425 . . . Interactive processing unit
1426 . . . Storage unit
1427 . . . Search unit
1428 . . . Calculation unit
200 . . . Data encoding system
210 . . . Orbiting vehicle
220 . . . Data encoding device
221 . . . Acquisition unit
222 . . . Encoding unit
230 . . . Ground station
240 . . . Data encoding control device
241 . . . Detection unit
242 . . . Determination unit
243 . . . Notification unit
250 . . . Sensor

What is claimed is:

1. A data encoding system comprising a data encoding device mounted on a flying object having a sensor, and a data encoding control device installed in a ground station capable of communicating with the flying object
wherein the data encoding control device includes:
detection unit configured to detect a position on earth sensed by the sensor;
determination unit configured to determine compression parameter information of sensing data acquired through sensing performed by the sensor, based on the detected position; and
notification unit configured to notify, to the data encoding device, the compression parameter information determined;
wherein the data encoding device includes:
acquisition unit configured to acquire the compression parameter information notified from the data encoding control device; and
encoding unit configured to compress sensing data acquired through sensing performed by the sensor, according to the compression parameter information acquired.

2. The data encoding system according to claim 1, wherein the determination unit is configured to determine the compression parameter information related to sensing data acquired through sensing performed with the sensor based on the detected position and information which is constituted by at least one of image size, sensing time, sensing direction, sensing altitude, sensor type, weather, temperature, humidity, PM 2.5 density, encoding scheme, and generated code amount per pixel.

3. The data encoding system according to claim 1, wherein the compression parameter information is granularity of quantization.

4. The data encoding system according to claim 1, wherein the compression parameter information is complexity of the sensing data.

5. The data encoding system according to claim 1, wherein the sensing data is an image.

6. The data encoding system according to claim 1, wherein the determination unit is configured to determine the compression parameter information by referring to a storage storing, in an associated manner, the position and information about the compression parameter or information for deriving the compression parameter information.

7. The data encoding system according to claim 6, wherein the determination unit is configured to determine the compression parameter information related to sensing data acquired through sensing performed with the sensor based on the detected position and information which is constituted by at least one of image size, sensing time, sensing direction, sensing altitude, sensor type, weather, temperature, humidity, PM 2.5 density, encoding scheme, and generated code amount per pixel.

8. The data encoding system according to claim 1, wherein the determination unit is configured to inquire of a user about the compression parameter information related to the position, and determine the compression parameter information, based on a response from the user in reply to the inquiry.

9. The data encoding system according to claim 8, wherein the determination unit is configured to determine the compression parameter information related to sensing data acquired through sensing performed with the sensor based on the detected position and information which is constituted by at least one of image size, sensing time, sensing direction, sensing altitude, sensor type, weather, temperature, humidity, PM 2.5 density, encoding scheme, and generated code amount per pixel.

10. The data encoding system according to claim 1, wherein the acquisition unit is configured to notify, to the data encoding device, data of a position on earth that is sensed by the sensor, and
the detection unit is configured to detect, with the sensor, a position on earth sensed by the sensor, based on the notified data of the position.

11. The data encoding system according to claim 10, wherein the determination unit is configured to determine the compression parameter information by referring to a storage storing, in an associated manner, the position and information about the compression parameter or information for deriving the compression parameter information.

12. The data encoding system according to claim 10, wherein the determination unit is configured to determine the compression parameter information related to sensing data acquired through sensing performed with the sensor based on the detected position and information which is constituted by at least one of image size, sensing time, sensing direction, sensing altitude, sensor type, weather, temperature, humidity, PM 2.5 density, encoding scheme, and generated code amount per pixel.

13. A data encoding device mounted on a flying object having a sensor, comprising:
acquisition unit configured to acquire compression parameter information from a data encoding control device installed in a ground station capable of communicating with the flying object, the data encoding control device detecting a position on earth sensed by the sensor and determining the compression parameter of sensing data acquired through sensing performed with the sensor, based on the detected position, the data encoding control device notifying the compression parameter information determined to the data encoding device; and encoding unit configured to compress the sensing data acquired through sensing performed with the sensor, based on the compression parameter information acquired.

14. A data encoding control device installed in a ground station capable of communicating with a flying object carrying a sensor and a data encoding device compressing sensing data acquired through sensing performed by the sensor, the data encoding control device comprising:

detection unit configured to detect a position on earth sensed by the sensor;

determination unit configured to determine compression parameter information of the sensing data acquired through sensing performed by the sensor, based on the detected position; and notification unit configured to notify, to the data encoding device, the compression parameter information determined.

* * * * *